United States Patent
Zheng et al.

(10) Patent No.: US 12,501,071 B2
(45) Date of Patent: Dec. 16, 2025

(54) METHOD FOR TRANSMITTING STREAMING MEDIA DATA AND RELATED DEVICE

(71) Applicant: HUAWEI TECHNOLOGIES CO., LTD., Guangdong (CN)

(72) Inventors: Bowen Zheng, Nanjing (CN); Xuesen Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 98 days.

(21) Appl. No.: 18/557,174

(22) PCT Filed: Apr. 1, 2022

(86) PCT No.: PCT/CN2022/084891
§ 371 (c)(1),
(2) Date: Oct. 25, 2023

(87) PCT Pub. No.: WO2022/228037
PCT Pub. Date: Nov. 3, 2022

(65) Prior Publication Data
US 2024/0223812 A1  Jul. 4, 2024

(30) Foreign Application Priority Data
Apr. 27, 2021 (CN) .......................... 202110459619.9

(51) Int. Cl.
*H04N 19/65* (2014.01)
*H04N 19/115* (2014.01)
(Continued)

(52) U.S. Cl.
CPC ........... *H04N 19/65* (2014.11); *H04N 19/115* (2014.11); *H04N 19/152* (2014.11); *H04N 19/177* (2014.11); *H04N 19/31* (2014.11)

(58) Field of Classification Search
CPC .... H04N 19/65; H04N 19/115; H04N 19/152; H04N 19/177; H04N 19/31; H04N 19/30;
(Continued)

(56) References Cited

U.S. PATENT DOCUMENTS

| | | | |
|---|---|---|---|
| 9,369,709 B2 | 6/2016 | Reznic et al. | |
| 2002/0071485 A1* | 6/2002 | Caglar | H04N 19/34 375/E7.091 |

(Continued)

FOREIGN PATENT DOCUMENTS

| | | |
|---|---|---|
| CN | 1926874 A | 3/2007 |
| CN | 102355738 A | 2/2012 |

(Continued)

OTHER PUBLICATIONS

Tao Fang et al: "GOP-based channel rate allocation using genetic algorithm for scalable video streaming over error-prone networks", IEEE Transactions on Image Processing, vol. 15, No. 6, Jun. 1, 2006 (Jun. 1, 2006) , pp. 1323-1330, XP093151604.

(Continued)

*Primary Examiner* — Tracy Y. Li

(57) ABSTRACT

A data streaming method includes determining M key frames in a target group of pictures GOP, where the target GOP includes L frames, M is an integer greater than 0, and L is an integer greater than 2. Scalable encoding is performed on source data of each of the M key frames to generate M pieces of base layer data and N pieces of extension layer data, where data quality of extension layer data corresponding to each key frame is higher than data quality of base layer data corresponding to each key frame, and N is an integer greater than or equal to M. Differential protection is performed on the base layer data and the extension layer data of each key frame to obtain first encoded data of the M key frames.

14 Claims, 12 Drawing Sheets

(51) Int. Cl.
*H04N 19/152* (2014.01)
*H04N 19/177* (2014.01)
*H04N 19/31* (2014.01)

(58) Field of Classification Search
CPC ....... H04N 21/43637; H04N 21/64792; H04N 21/234327; H04N 19/114; H04N 21/6473; H04N 21/64784; H04L 65/70; H04L 65/762
See application file for complete search history.

(56) References Cited

U.S. PATENT DOCUMENTS

| | | | |
|---|---|---|---|
| 2007/0033494 A1* | 2/2007 | Wenger ................ | H04N 19/147 375/E7.153 |
| 2016/0050424 A1* | 2/2016 | Choi .................... | H04N 19/172 375/240.12 |
| 2018/0098077 A1* | 4/2018 | Skupin ................ | H04N 19/577 |
| 2019/0089966 A1* | 3/2019 | Mandapadi Ramasubramanian ...................... | H04N 19/109 |
| 2019/0261007 A1* | 8/2019 | Emmanuel ............... | H04N 7/12 |
| 2021/0120232 A1* | 4/2021 | Srikantam ............ | H04N 19/172 |

FOREIGN PATENT DOCUMENTS

| | | |
|---|---|---|
| CN | 107592540 A | 1/2018 |
| CN | 108183774 A | 6/2018 |
| CN | 110876066 A | 3/2020 |
| CN | 111629282 A | 9/2020 |
| CN | 112291569 A | 1/2021 |
| EP | 2667623 A2 | 11/2013 |

OTHER PUBLICATIONS

Maani E et al: "Unequal Error Protection for Robust Streaming of Scalable Video Over Packet Lossy Networks", IEEE Transactions on Circuits and Systems for Video Technology, IEEE, USA, vol. 20, No. 3, Mar. 1, 2010 (Mar. 1, 2010), pp. 407-416, XP011297085.

Cheng-Han Lin et al: "An unequal error protection mechanism for video streaming over IEEE 802. 11 e WLANs", Computer Networks, vol. 56, No. 11 , Jul. 31, 2012 (Jul. 31, 2012), pp. 2590-2599, XP028501825.

Yu Wang et al, "GOP-based Unequal Error Protection for Scalable Video over Packet Erasure Channel", 2008 IEEE International Symposium on Broadband Multimedia Systems and Broadcasting, total 4 pages.

Y. Shi et al., A Novel Unequal Loss Protection Approach for Scalable Video Streaming over Wireless Networks, Contributed Paper, Manuscript, 6 pages.

Shi Ying bo et al, Robust wireless transmission scheme for scalable video streaming, Journal on Communications, vol. 29, No. 7, Jul. 2008, with an English Abstract, 6 pages.

* cited by examiner

METHOD FOR TRANSMITTING STREAMING MEDIA DATA AND RELATED DEVICE

CROSS-REFERENCE TO RELATED APPLICATIONS

This application is a national stage of International Application No. PCT/CN2022/084891 filed on Apr. 1, 2022, which claims priority to Chinese Patent Application No. 202110459619.9 filed on Apr. 27, 2021. Both of the aforementioned applications are hereby incorporated by reference in their entireties.

TECHNICAL FIELD

The present invention relates to the field of information processing, and in particular, to a method for transmitting streaming media data and a related device.

BACKGROUND

With the continuous development of Internet technologies, a streaming media wireless projection technology is applied more and more widely. Streaming media refers to a media format that is continuously played in real time on a network by using a streaming transmission technology, for example, audio, video, or multimedia files. The streaming media wireless projection technology refers to a technology that sends streaming media data from a source end to a destination end for display, such as Miracast and DLNA. Because the streaming media wireless projection technology involves processes such as video encoding, protocol processing, Wi-Fi transmission, and video decoding, there is a streaming media wireless projection delay. That is, there is a specific time difference between a time at which an interface is displayed at the source end and a time at which same interface information arrives at the destination end.

Currently, in a process of sending the interface information of the source end to the destination end, a large quantity of packets may be lost/discarded, thereby causing problems such as erratic display on the destination end. To avoid the foregoing case, in the conventional technology, a NACK or ACK manner is used to send a retransmission request between the source end and the destination end, to ensure that the destination end can completely receive all streaming media data. However, in actual application, it is found that, because a NACK or ACK feedback manner is used between the source end and the destination end, when packet loss occurs at the destination end, the source end resends interface information to the destination end, which causes an extra delay and increases a streaming media wireless projection delay.

Therefore, how to reduce a streaming media data transmission delay to improve user experience is an urgent problem to be resolved.

SUMMARY

In view of the technical problems to be resolved by embodiments of the present invention, a method for transmitting streaming media data and a related device are provided, to reduce a streaming media data transmission delay and improve user experience in a streaming media wireless projection technology.

According to a first aspect, an embodiment of the present invention provides a method for transmitting streaming media data, applied to a source end. The method includes: determining M key frames in a target group of pictures GOP, where the target GOP includes L frames, M is an integer greater than 0, and L is an integer greater than 2; separately performing scalable encoding on source data of each of the M key frames, to generate M pieces of base layer data and N pieces of extension layer data, where data quality of extension layer data corresponding to each key frame is higher than data quality of base layer data corresponding to each key frame, and N is an integer greater than or equal to M; and performing differential protection on the base layer data and the extension layer data of each key frame to obtain first encoded data of the M key frames, where the first encoded data includes M pieces of base layer data that have undergone the differential protection and N pieces of extension layer data that have undergone the differential protection.

In this embodiment of the present invention, a plurality of key frames in the target group of pictures may be first determined, and then source data of the plurality of key frames is processed by using a scalable encoding technology and a differential protection technology to obtain encoded streaming media data, so that occurrence of packet loss and a retransmission event may be reduced in a streaming media data transmission process, thereby reducing a streaming media data transmission delay. Specifically, the scalable encoding is performed on the key frame, the source data of the key frame is processed into the base layer data and the extension layer data, and then the differential protection is performed on the base layer data and the extension layer data separately. Because the data quality of the base layer data is lower than the data quality of the extension layer data, enhanced protection may be performed on the base layer data, and reduced protection may be performed on the extension layer data, the base layer data is less likely to be lost and error-prone than the extension layer data in a streaming media data transmission process. Even if the extension layer data is lost, a destination end may decode and play the received correct base layer data. In conclusion, different from the conventional technology in which information of the key frame is directly transmitted, and the source end needs to resend data once packet loss occurs, in the streaming media data transmission, this embodiment of the present invention performs quality scalability on the source data of the plurality of key frames and performs the differential protection on data at different layers, to ensure that the base layer data may reach the destination end. Even if data loss occurs at the extension layer data, the destination end may perform decoding and playing based on the base layer data. In this way, occurrence of a retransmission event and packet loss may be reduced, thereby reducing a streaming media data transmission delay. In addition, streaming media data of different quality may be provided for the destination end for decoding and playing, thereby effectively improving user experience.

In a possible implementation, the determining M key frames in a target group of pictures GOP includes: obtaining the target group of pictures GOP, and dividing the target GOP into M subgroups of pictures based on a time sequence, where M is an integer greater than 0; and determining a first frame in each subgroup of pictures as the key frame, to obtain the M key frames.

In the conventional technology, only a first frame (for example, an I-frame) in a target group of pictures is used as a key frame, and then other frames in the target group of pictures sequentially perform previous reference based on the key frame. If an error occurs in the key frame, an error occurs in frames in the entire target group of pictures. However, in this embodiment of the present invention, the target group of pictures may be first grouped based on the time sequence, and a first frame in each group is further used as a key frame to obtain a plurality of key frames. If an error occurs in one of the plurality of key frames, only some frames in the target group of pictures are affected. In this way, a possibility of an error in streaming media data is reduced, a streaming media data transmission delay is reduced, and user experience is effectively improved.

In a possible implementation, the method further includes: dividing each of the M subgroups of pictures into F frame sequences based on the time sequence, where F is an integer greater than 1, and each of the F frame sequences includes at least two frames; and obtaining first differential frames of F−1 frame sequences other than a first frame sequence in the F frame sequences by using a frame header of a frame sequence in k−1 frame sequences before a $k^{th}$ frame sequence as a reference frame for a frame header of the $k^{th}$ frame sequence in the F frame sequences, where k is an integer greater than 2 and less than or equal to F.

In this embodiment of the present invention, after the target group of pictures is divided into a plurality of subgroups of pictures based on the time sequence, each subgroup of pictures may be further divided into a plurality of frame sequences based on the time sequence, and then a frame header of each frame sequence may use a key frame in the subgroup of pictures as a reference frame, or may use an obtained first differential frame as a reference frame. Therefore, different frames in the target group of pictures have a more flexible reference relationship, thereby reducing a possibility of an error in streaming media data, reducing a streaming media data transmission delay, and effectively improving user experience.

In a possible implementation, the method further includes: obtaining an $i^{th}$ differential frame of each frame sequence by using an $(i-1)^{th}$ frame as a reference frame for an $i^{th}$ frame in each of the F frame sequences, where i is an integer greater than 1.

In this embodiment of the present invention, other frames other than the first frame in each frame sequence may use a previous frame as a reference frame, so that a data amount of streaming media data may be reduced to some extent, thereby reducing a streaming media data transmission delay and effectively improving user experience.

In a possible implementation, the performing differential protection on the base layer data and the extension layer data of each key frame to obtain first encoded data of the M key frames includes: dynamically adding m redundant data packets to the base layer data corresponding to each key frame and dynamically adding n redundant data packets to the extension layer data corresponding to each key frame, to generate the M pieces of base layer data that have undergone the differential protection and the N pieces of extension layer data that have undergone the differential protection, to obtain the first encoded data, where m is greater than n, m is an integer greater than 2, and n is an integer greater than 1.

In this embodiment of the present invention, a quantity of redundant data packets added to the base layer data or the extension layer data may be dynamically adjusted based on a current network condition. If the current network condition is relatively poor, the quantity of redundant data packets may be appropriately increased. However, for the base layer data and the extension layer data of a same key frame, because importance of the base layer data is higher than that of the extension layer data in this embodiment of the present invention, the quantity of redundant data packets added to the base layer data is required to be greater than the quantity of redundant data packets added to the extension layer data, so that the base layer data is not easily lost or damaged, thereby ensuring smoothness of a video image of a user, reducing a streaming media data transmission delay, and effectively improving user experience.

In a possible implementation, the method further includes: obtaining target encoded data based on the first encoded data, the $i^{th}$ differential frame in each frame sequence of each subgroup of pictures, and a corresponding first differential frame; and sending the target encoded data to a destination end.

In this embodiment of the present invention, the target encoded data is obtained based on related data of the key frame that have undergone the scalable encoding and the differential protection and related data of other frames other than the key frame in the target group of pictures, and then the target encoded data is sent to the destination end, so that the destination end performs decoding and playing. In this way, occurrence of a retransmission event and packet loss may be reduced, thereby reducing a streaming media data transmission delay. In addition, streaming media data of different quality may be provided for the destination end for decoding and playing, thereby effectively improving user experience.

In a possible implementation, the sending the target encoded data to a destination end includes: preferentially sending the M pieces of base layer data in the first encoded data that have undergone the differential protection, and then sending other data in the target encoded data other than the M pieces of base layer data that have undergone the differential protection.

In this embodiment of the present invention, differentiated scheduling is performed on different streaming media data. In a case of network air interface congestion or system scheduling shortage, it is required to ensure that information with a base layer tag (for example, M pieces of base layer data that have undergone differential protection) is preferentially transmitted, and then other information is sent. In this way, an access delay of an air interface may be reduced, thereby reducing a streaming media data transmission delay, and effectively improving user experience.

In a possible implementation, the preferentially sending the M pieces of base layer data in the first encoded data that have undergone the differential protection includes: using the M pieces of base layer data that have undergone the differential protection as a header, and adding the other data in the target encoded data other than the M pieces of base layer data that have undergone the differential protection after the M pieces of base layer data that have undergone the differential protection, to obtain a low latency transmission queue; and sending the target encoded data to the destination end based on the low latency transmission queue.

In this embodiment of the present invention, information with a base layer tag (for example, M pieces of base layer data that have undergone differential protection) is used as a queue header, and other information is added to a queue tail to obtain a low latency transmission queue. Data transmission is performed based on the low latency transmission queue, so that it can be ensured that the information with the base layer tag is preferentially transmitted, and then other information is sent. In this way, an access delay of an air interface is reduced, thereby reducing a streaming media data transmission delay, and effectively improving user experience.

According to a second aspect, an embodiment of the present invention provides a method for transmitting streaming media data, applied to a destination end. The method includes: receiving target encoded data sent by a source end, where the target encoded data includes data information obtained after scalable encoding and differential protection are performed on source data of M key frames in a target group of pictures, and data information of differential frames in the target group of pictures; and decoding the target encoded data to obtain source data of the target group of pictures.

In this embodiment of the present invention, the destination end receives the encoded streaming media information sent by the source end, and then decodes and plays the encoded streaming media information as required, so that occurrence of packet loss and a retransmission event may be reduced, thereby reducing a streaming media data transmission delay.

According to a third aspect, an embodiment of the present invention provides a device for transmitting streaming media data. The device includes: a first processing unit, configured to determine M key frames in a target group of pictures GOP, where the target GOP includes L frames, M is an integer greater than 0, and L is an integer greater than 2; a first encoding unit, configured to separately perform scalable encoding on source data of each key frame in the M key frames, to generate M pieces of base layer data and N pieces of extension layer data, where data quality of extension layer data corresponding to each key frame is higher than data quality of base layer data corresponding to each key frame, and N is an integer greater than or equal to M; and a second processing unit, configured to perform differential protection on the base layer data and the extension layer data of each key frame, to obtain first encoded data of the M key frames, where the first encoded data includes M pieces of the base layer data that have undergone the differential protection and N pieces of the extension layer data that have undergone the differential protection.

In a possible implementation, the first processing unit is specifically configured to: obtain the target group of pictures GOP, and divide the target GOP into M subgroups of pictures based on a time sequence, where M is an integer greater than 0; and determine a first frame in each subgroup of pictures as the key frame, to obtain the M key frames.

In a possible implementation, the device further includes: a third processing unit, configured to divide each of the M subgroups of pictures into F frame sequences based on the time sequence, where F is an integer greater than 1, and each of the F frame sequences includes at least two frames; and a fourth processing unit, configured to obtain first differential frames of F−1 frame sequences other than a first frame sequence in the F frame sequences by using a frame header of a frame sequence in k−1 frame sequences before a $k^{th}$ frame sequence as a reference frame for a frame header of the $k^{th}$ frame sequence in the F frame sequences, where k is an integer greater than 2 and less than or equal to F.

In a possible implementation, the device further includes a fifth processing unit, configured to obtain an $i^{th}$ differential frame of each frame sequence by using an $(i-1)^{th}$ frame as a reference frame for an $i^{th}$ frame in each of the F frame sequences, where i is an integer greater than 1.

In a possible implementation, the second processing unit is specifically configured to dynamically add m redundant data packets to the base layer data corresponding to each key frame and dynamically add n redundant data packets to the extension layer data corresponding to each key frame, to generate the M pieces of the base layer data that have undergone the differential protection and the N pieces of the extension layer data that have undergone the differential protection, to obtain the first encoded data, where m is greater than n, m is an integer greater than 2, and n is an integer greater than 1.

In a possible implementation, the device further includes: a sixth processing unit, configured to obtain target encoded data based on the first encoded data, the $i^{th}$ differential frame in each frame sequence of each subgroup of pictures, and a corresponding first differential frame; and a first sending unit, configured to send the target encoded data to a destination end.

In a possible implementation, the first sending unit is specifically configured to: preferentially send the M pieces of base layer data in the first encoded data that have undergone the differential protection, and then send other data in the target encoded data other than the M pieces of base layer data that have undergone the differential protection.

In a possible implementation, the first sending unit is specifically configured to: use the M pieces of base layer data that have undergone the differential protection as a header, and add the other data in the target encoded data other than the M pieces of base layer data that have undergone the differential protection after the M pieces of base layer data that have undergone the differential protection, to obtain a low latency transmission queue; and send the target encoded data to the destination end based on the low latency transmission queue.

According to a fourth aspect, an embodiment of the present invention provides a device for transmitting streaming media data. The device includes: a first receiving unit, configured to receive target encoded data sent by a source end, where the target encoded data includes data information obtained after scalable encoding and differential protection are performed on source data of M key frames in a target group of pictures, and data information of differential frames in the target group of pictures; and a first decoding unit, configured to decode the target encoded data to obtain source data of the target group of pictures.

According to a fifth aspect, an embodiment of the present invention provides a chip system. The chip system includes at least one processor, a memory, and an interface circuit. The memory, the interface circuit, and the at least one processor are interconnected by using lines. At least one memory stores instructions, and when the instructions are executed by the processor, the method according to any implementation of the first aspect is implemented.

According to a sixth aspect, an embodiment of the present invention provides a chip system. The chip system includes at least one processor, a memory, and an interface circuit. The memory, the interface circuit, and the at least one processor are interconnected by using lines. At least one memory stores instructions, and when the instructions are executed by the processor, the method according to the second aspect is implemented.

According to a seventh aspect, an embodiment of the present invention provides a computer storage medium. The computer storage medium stores a computer program. When the computer program is executed by a processor, the method according to any implementation of the first aspect is implemented.

According to an eighth aspect, an embodiment of the present invention provides a computer storage medium. The computer storage medium stores a computer program. When the computer program is executed by a processor, the method according to the second aspect is implemented.

According to a ninth aspect, an embodiment of the present invention provides a computer program. The computer program includes instructions. When the computer program is executed by a computer, the computer is enabled to perform the method according to any implementation of the first aspect.

According to a tenth aspect, an embodiment of the present invention provides a computer program. The computer program includes instructions. When the computer program is executed by a computer, the computer is enabled to perform the method according to the second aspect.

According to an eleventh aspect, an embodiment of the present invention provides an electronic device, including a processor, a memory, and a communication interface. The memory is configured to store program code for sending information, and the processor is configured to invoke program code of streaming media data transmission method to perform the method according to any implementation of the first aspect.

According to a twelfth aspect, an embodiment of the present invention provides an electronic device, including a processor, a memory, and a communication interface. The memory is configured to store program code for sending information. The processor is configured to invoke program code of streaming media data transmission method to perform the method according to any implementation of the second aspect.

DESCRIPTION OF EMBODIMENTS

Terms used in the following embodiments of this application are merely intended to describe specific embodiments, but are not intended to limit this application. Terms "one", "a/an", "the", "the foregoing", "this", and "the one" of singular forms used in this specification and the appended claims of this application are also intended to include plural forms, unless otherwise specified in the context clearly. It should be further understood that the term "and/or" used in this application indicates and includes any or all possible combinations of one or more listed items.

First, a technical problem to be specifically resolved in this application is analyzed and proposed. In the conventional technology, a specific procedure of a streaming media data transmission technology, that is, a technology of sending interface information of a source end to a destination end for display, is as follows.

Figure 1A:
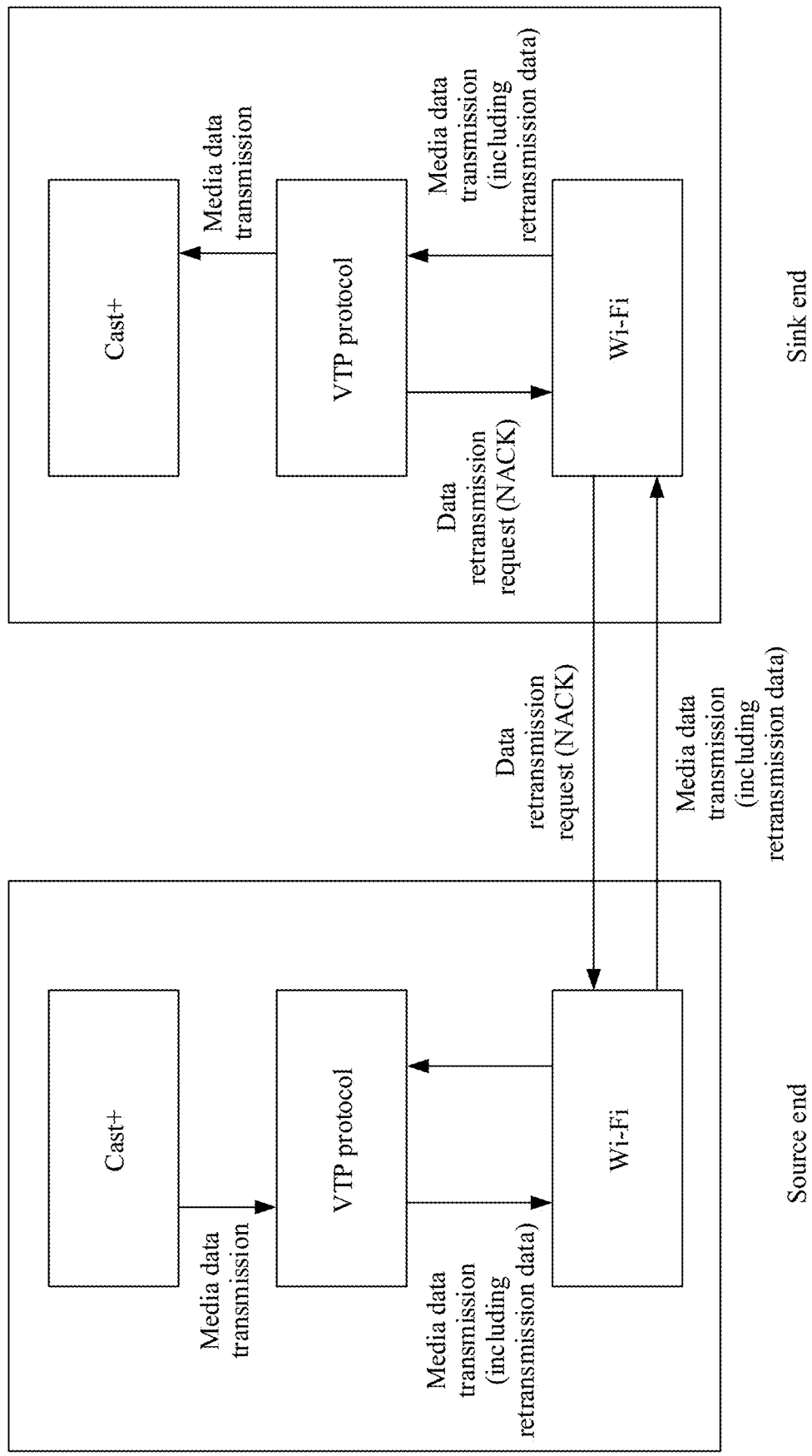
FIG. 1A is a schematic flowchart of a projection protocol in the conventional technology.
Figure 1B:
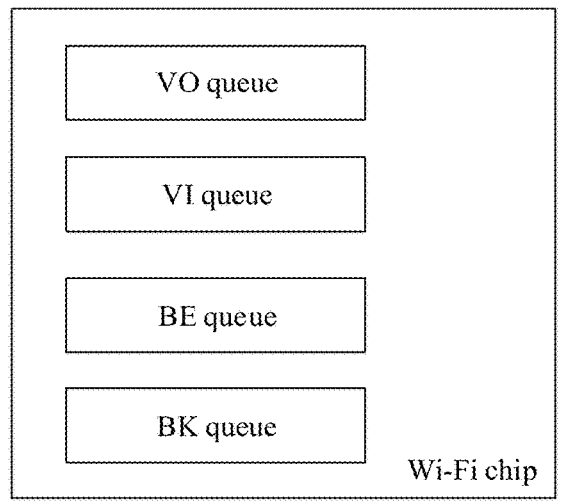
FIG. 1B is a schematic diagram of a transmission manner for transmitting streaming media data according to the conventional technology.

FIG. TA is a schematic flowchart of a projection protocol in the conventional technology. A projection process in the figure is sending data from a source end (for example, a mobile phone) to a sink end (for example, a large screen), and a data stream is sequentially from an application side (Cast+) on the mobile phone end to a protocol side (VTP), to a Wi-Fi chip on the large screen end, to a protocol side (VTP), and then to an application side (Cast+). When packet loss occurs, the sink end (for example, the large screen) initiates a NACK request, and the source end is responsible for retransmitting a lost packet. It should be noted that FIG. 1B is a schematic diagram of a transmission manner for transmitting streaming media data according to the conventional technology. In the figure, a Wi-Fi chip may provide a VO queue, a VI queue, a BE queue, and a BK queue transmission manner, but only the VI queue may be used for transmission in a streaming media data transmission process in the conventional technology.

In this solution, the streaming media data information may be sent from the source end to the destination end. However, the solution has the following disadvantages:

Disadvantage 1: A NACK feedback mode occupies air interface resources.

Disadvantage 2: When packet loss occurs on the destination end, a NACK is generated, and the source end needs to retransmit a packet, which causes an extra transmission delay.

Disadvantage 3: The destination end performs decoding at a decoder only when receiving a complete group of pictures, which causes an extra delay.

Disadvantage 4: Only the VI queue may be used for streaming media data during bottom layer Wi-Fi transmission. However, the VI queue does not perform differentiated scheduling for media data.

In conclusion, in an existing streaming media data transmission method, when a source end device sends streaming media data to a destination end device, an extra delay is increased, resulting in poor user experience. Therefore, a streaming media data transmission method provided in this application is used to resolve the foregoing technical problems.

The following describes embodiments of this application with reference to the accompanying drawings.

Figure 2A:
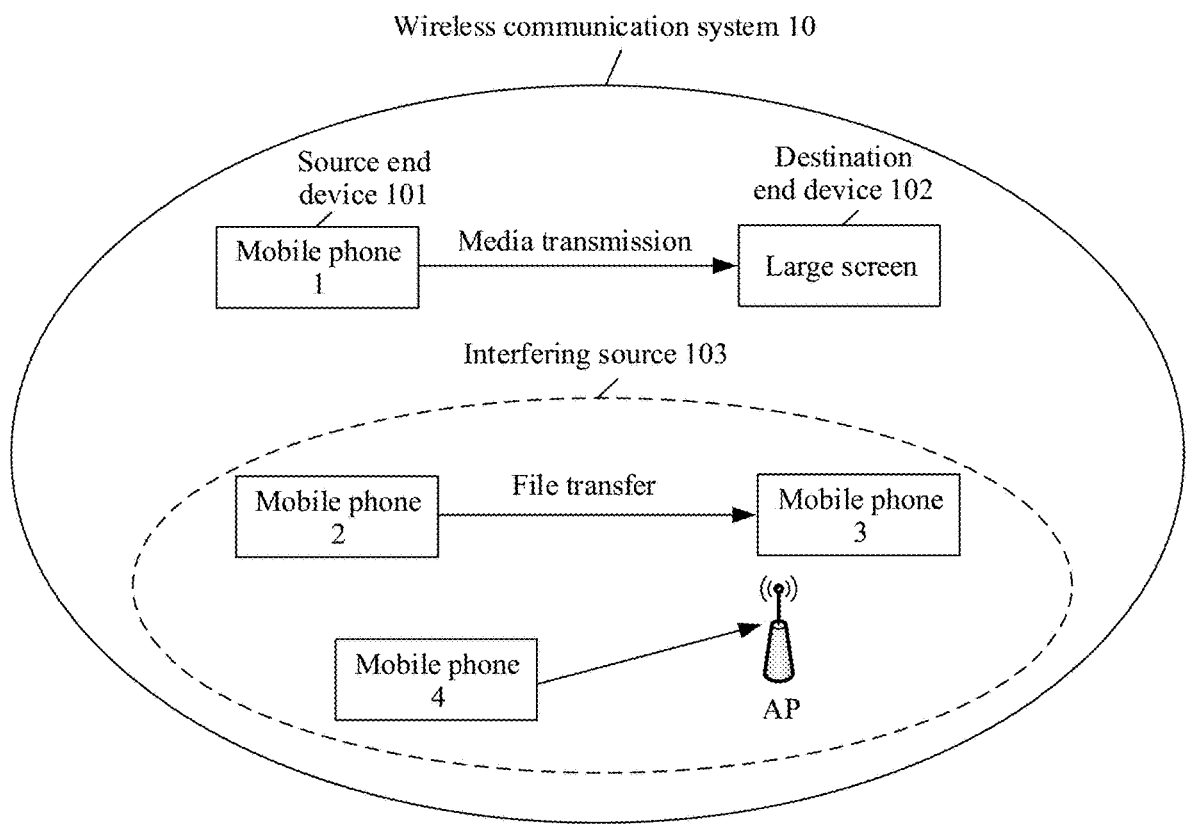
FIG. 2A is a schematic diagram of an architecture of a wireless communication system according to an embodiment of the present invention.

Based on the foregoing technical problems, to facilitate understanding of embodiments of the present invention, the following first describes a system architecture on which embodiments of the present invention are based. FIG. 2A is a schematic diagram of an architecture of a wireless communication system according to an embodiment of the present invention. The wireless communication system 10 is configured to reduce a streaming media data transmission delay in a streaming media wireless projection technology, to improve user experience. The system architecture may include a source end device 101, a destination end device 102, and an interfering source 103.

The source end device 101 may be distributed throughout the wireless communication system, and may be stationary or mobile. In some embodiments of this application, the source end device 101 may be a mobile device. For example, a common mobile device includes a device such as a smartphone and a tablet computer. In a future communication system, the source end device 101 may alternatively be a streaming media data transmission device in this application, or a device configured to include a streaming media data transmission apparatus in this application. In this embodiment of the present invention, the source end device 101 may be understood as a device having a streaming media function, for example, a device having a video playing function, and the source end device 101 may establish a connection to another device by using a network. For example, when the source end device 101 is a mobile phone 1, the mobile phone 1 has a video playing function. After the mobile phone 1 establishes a connection to another device by using a network, the mobile phone 1 may perform projection to the device.

The destination end device 102 may be distributed throughout the wireless communication system, and may be stationary or mobile. In some embodiments of this application, the destination end device 102 may be a mobile device. For example, a common mobile device includes some large-screen devices such as a smart screen and a tablet computer. In this embodiment of the present invention, the destination end device 102 may be understood as a device having a streaming media function, for example, a device having a video playing function, and the destination end device 102 may establish a connection to the source end device 101 by using a network. For example, when the source end device 101 is a mobile phone 1, and the destination end device 102 is a large screen, if the mobile phone 1 may establish a connection to the large screen by using a network, the mobile phone 1 may project a video image played on the mobile phone 1 to the large screen for playing.

The interfering source 103 may be understood as a device that affects communication between the source end device 101 and the destination end device 102. For example, in the wireless communication system, file transfer between a mobile phone 2 and a mobile phone 3 causes interference to communication between the mobile phone 1 and the large screen, and communication between a mobile phone 4 and a wireless access point also causes interference to communication between the mobile phone 1 and the large screen. It may be understood that communication between other devices in the wireless communication system interferes with communication between the mobile phone 1 and the large screen. It should be noted that, after the streaming media information sent by the source end device is interfered by the external interference, a phenomenon such as packet loss may be caused, thereby affecting communication between the source end device and the destination end device.

It may be understood that the architecture of the wireless communication system in FIG. 2A is merely an example implementation in this embodiment of this application, and the architecture of the wireless communication system in this embodiment of this application includes but is not limited to the foregoing system architecture.

Figure 2B:
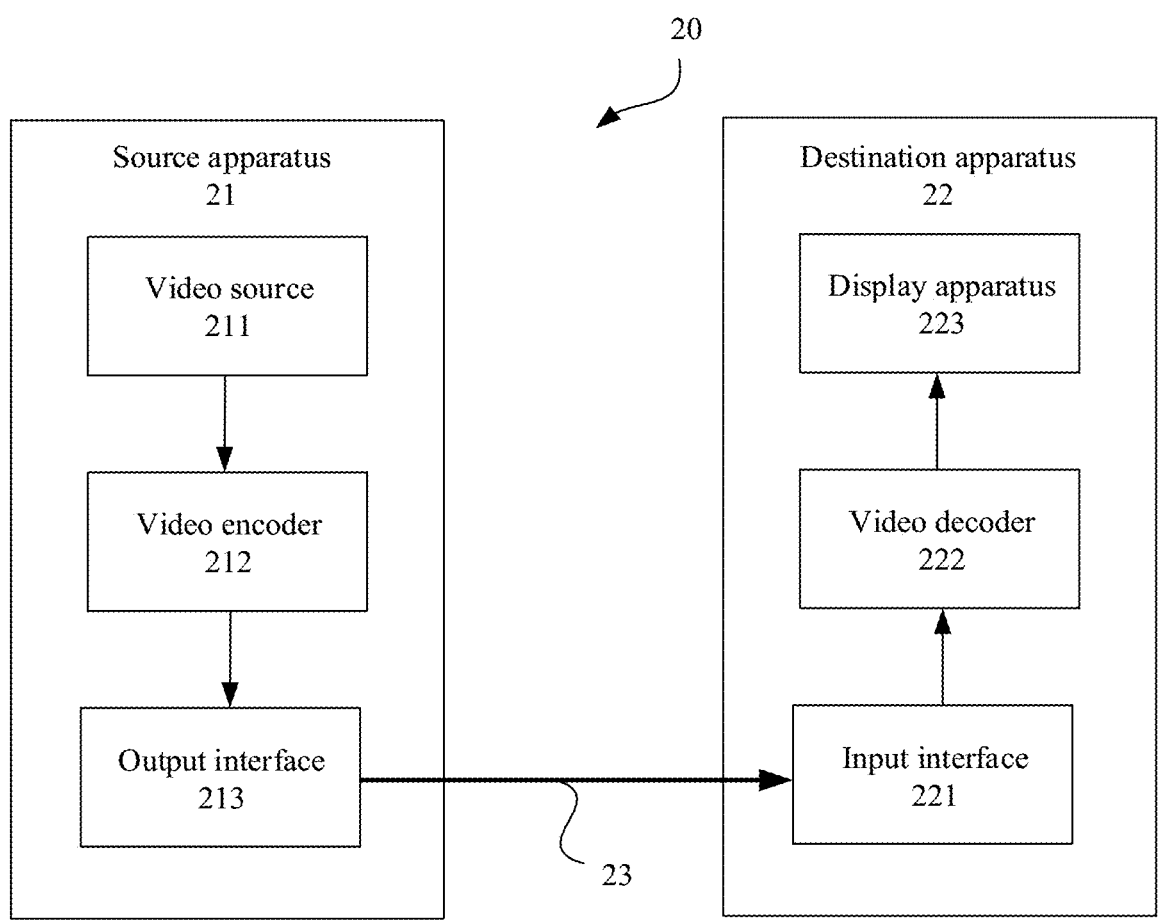
FIG. 2B is a schematic block diagram of a video encoding and decoding system 20 according to an embodiment of the present invention.

Based on the technical problem and the system architecture, for ease of understanding embodiments of the present invention, the following first describes a video encoding and decoding system on which embodiments of the present invention are based. FIG. 2B is a schematic block diagram of a video encoding and decoding system 20 according to an embodiment of the present invention. As shown in FIG. 2B, the video encoding and decoding system 20 includes a source apparatus 21 and a destination end apparatus 22. The source apparatus 21 generates encoded video data. Therefore, the source apparatus 21 may be referred to as a video encoding apparatus or a video encoding device. The destination apparatus 22 may decode the encoded video data generated by the source apparatus 21. Therefore, the destination apparatus 22 may be referred to as a video decoding apparatus or a video decoding device. The source apparatus 21 and the destination apparatus 22 may be examples of video encoding and decoding apparatuses or video encoding and decoding devices. The source apparatus 21 and the destination apparatus 22 may include a wide range of apparatuses, including a desktop computer, a mobile computing apparatus, a notebook (for example, a laptop) computer, a tablet computer, a set top box, a handset such as a smartphone, a television, a camera, a display apparatus, a digital media player, a video game console, an in-vehicle computer, or the like.

The destination apparatus 22 may receive the encoded video data from the source apparatus 21 by using a channel 23. The channel 23 may include one or more media and/or apparatuses capable of moving the encoded video data from the source apparatus 21 to the destination apparatus 22. For example, the channel 23 may include one or more communication media that enable the source apparatus 21 to directly transmit the encoded video data to the destination apparatus 22 in real time. In this example, the source apparatus 21 may modulate the encoded video data according to a communication standard (for example, a wireless communication protocol), and may transmit modulated video data to the destination apparatus 22. The one or more communication media may include a wireless communication medium and/or a wired communication medium such as a radio frequency (RF) spectrum, or one or more physical transmission lines. The one or more communication media may form a part of a packet-based network (for example, a local area network, a wide area network, or a global network (for example, the Internet)). The one or more communication media may include a router, a switch, a base station, or another device that facilitates communication from the source apparatus 21 to the destination apparatus 22.

The destination apparatus 22 may access the encoded video data by using a standard data connection (for example, an Internet connection). Examples of the data connection include a wireless channel (for example, a Wi-Fi connection), a wired connection (for example, a DSL or a cable modem), or a combination thereof adapted to access the encoded video data stored on a file server. Transmission of the encoded video data from the file server may be streaming transmission, download transmission, or a combination thereof.

In the example in FIG. 2B, the source apparatus 21 includes a video source 211, a video encoder 212, and an output interface 213. In some examples, the output interface 213 may include a modulator/demodulator (modem) and/or a transmitter. The video source 211 may include a video capture apparatus (for example, a video camera), a video archive including previously captured video data, a video input interface that is configured to receive video data from a video content provider, and/or a computer graphics system that is configured to generate video data, or a combination of the foregoing video data sources.

The video encoder 212 may encode video data that comes from the video source 211. In some examples, the source apparatus 21 directly transmits the encoded video data to the destination apparatus 22 by using the output interface 213. The encoded video data may alternatively be stored on a storage medium or the file server for later access by the destination apparatus 22 for decoding and/or playing.

In the example in FIG. 2B, the destination apparatus 22 includes an input interface 221, a video decoder 222, and a display apparatus 223. In some examples, the input interface 221 includes a receiver and/or a modem. The input interface 221 may receive the encoded video data by using the channel 23. The display apparatus 223 may be integrated with the destination apparatus 22 or may be disposed outside the destination apparatus 22. Usually, the display apparatus 223 displays decoded video data. The display apparatus 223 may include a plurality of display apparatuses such as a liquid crystal display (LCD), a plasma display, an organic light-emitting diode (OLED) display, or another type of display apparatus.

Figure 2C:
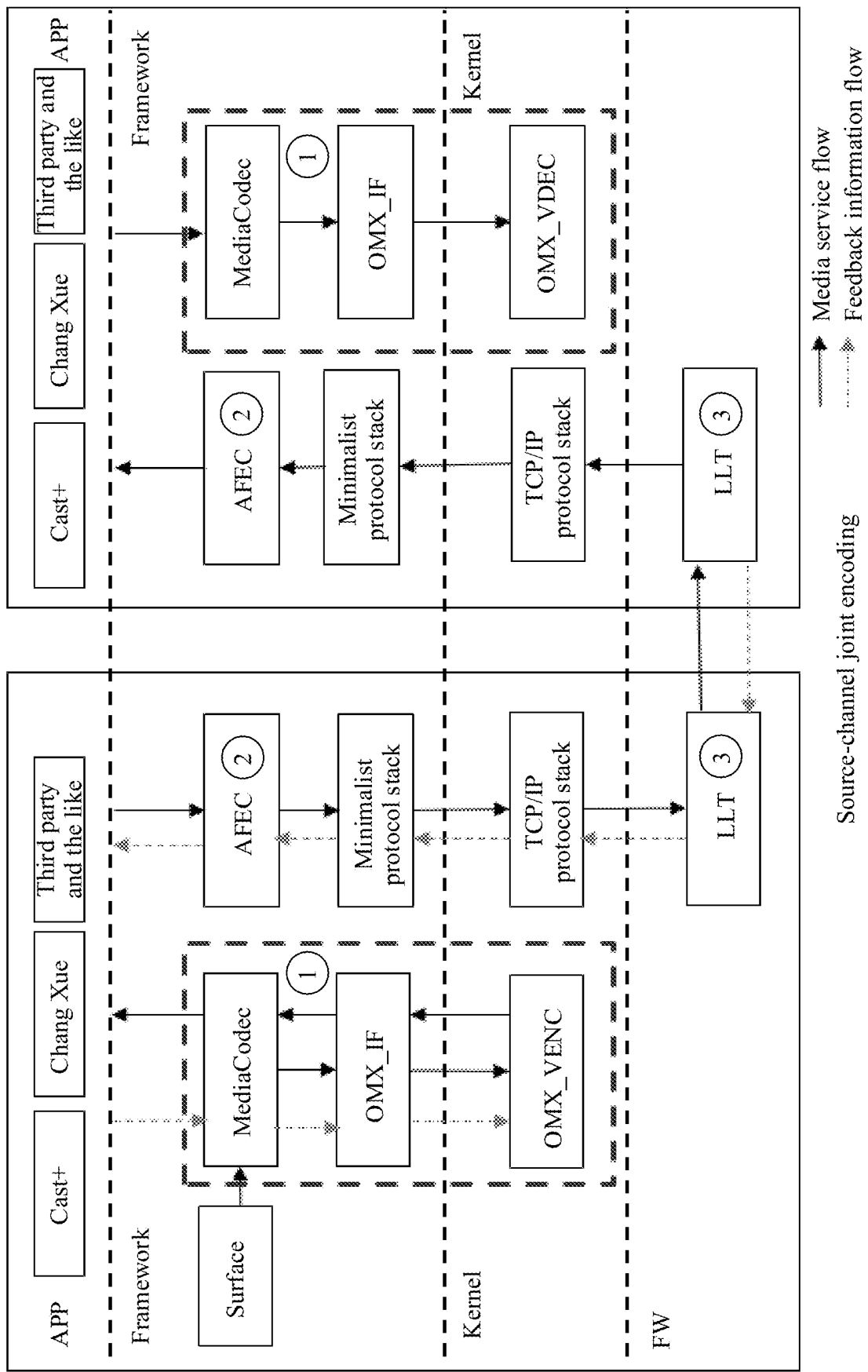
FIG. 2C is a framework diagram of a system for transmitting streaming media data according to an embodiment of the present invention.

For example, FIG. 2C is a framework diagram of a system for transmitting streaming media data according to an embodiment of the present invention. In the figure, Media-Codec, OMX_IF, and OMX_VENC are used to perform video scalable encoding. In this embodiment of the present invention, two scalability technologies, namely, a quality scalability and a temporal scalability, are used, and a QP is set with a frame to achieve a scalability effect, to separate data at a base layer from data at an extension layer. Adaptive forward error correction (AFEC) is used to implement differential protection for the basic layer and extension layer output by scalable encoding, to implement enhanced protection for the basic layer and reduced protection for the extension layer. LLT queues are added to channels to perform differentiated scheduling based on input parameters (such as I-frame/P-frame and basic layer/extension layer information) of a signal source, for example, adjusting an aggregation degree to ensure that a priority of the basic layer is always higher than that of the extension layer.

It may be understood that the video encoding and decoding system in FIG. 2B is merely an example implementation of this embodiment of this application. The video encoding and decoding system architecture in this embodiment of this application includes but is not limited to the foregoing system architecture.

Figure 3A:
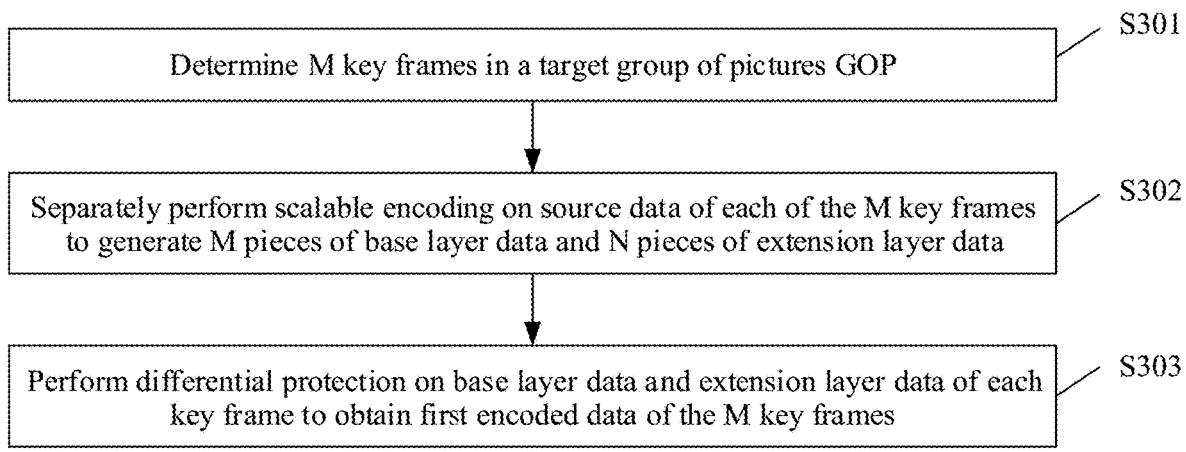
FIG. 3A is a schematic flowchart of a method for transmitting media data according to an embodiment of the present application.

The following describes a specific method architecture on which this embodiment of the present invention is based. FIG. 3A is a schematic flowchart of a method for transmitting media data according to an embodiment of this application. The following describes the method for transmitting streaming media data in the embodiments of this application with reference to FIG. 3A and based on the source end in FIG. 2A and FIG. 2B. It should be noted that, to describe the method for transmitting media data in this embodiment of this application in more detail, in each procedure step of this application, that a corresponding execution body is the source end or the destination end is described. However, this does not mean that in this embodiment of this application, a corresponding method procedure may be performed only by using the described execution body.

Step S301: A source end determines M key frames in a target group of pictures GOP.

Figure 3B:
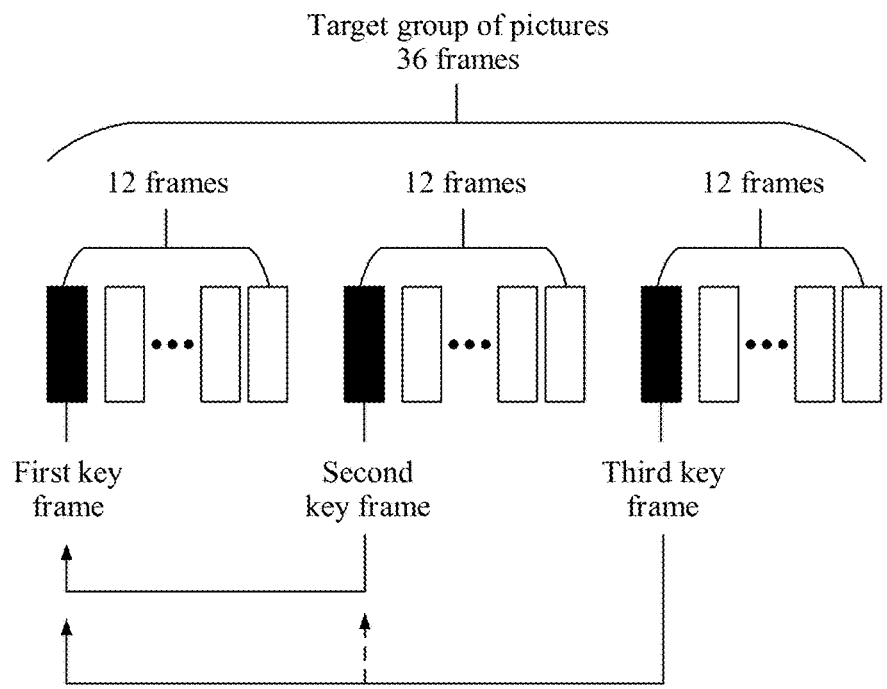
FIG. 3B is a schematic diagram of a key frame in a target group of pictures according to an embodiment of the present invention.

Specifically, the target GOP includes L frames, where M is an integer greater than 0, and L is an integer greater than 2. The source end may be understood as a video encoding apparatus or a video encoding device. For example, the source end may be a smartphone, and may generate encoded video data. The target group of pictures may be understood as a continuous picture. In this embodiment of the present invention, a first frame (for example, a first key frame in the target group of pictures) in the target group of pictures may be understood as an I-frame, and the I-frame may be understood as a complete picture. The M key frames may be understood as important reference frames in the target group of pictures. A first key frame in the M key frames may be an I-frame in the target group of pictures. An $S^{th}$ key frame in the M key frames may use one of key frames before the $S^{th}$ key frame as a reference frame. S is an integer greater than 2 and less than M. For example, FIG. 3B is a schematic diagram of a key frame in a target group of pictures according to an embodiment of the present invention. In the figure, a 36-frame target group of pictures may include three key frames, where a first key frame may be an I-frame in the target group of pictures, a second key frame may use the first key frame as a reference frame, and a third key frame may use the first key frame as a reference frame, or may use the second key frame as a reference frame.

Figure 3C:
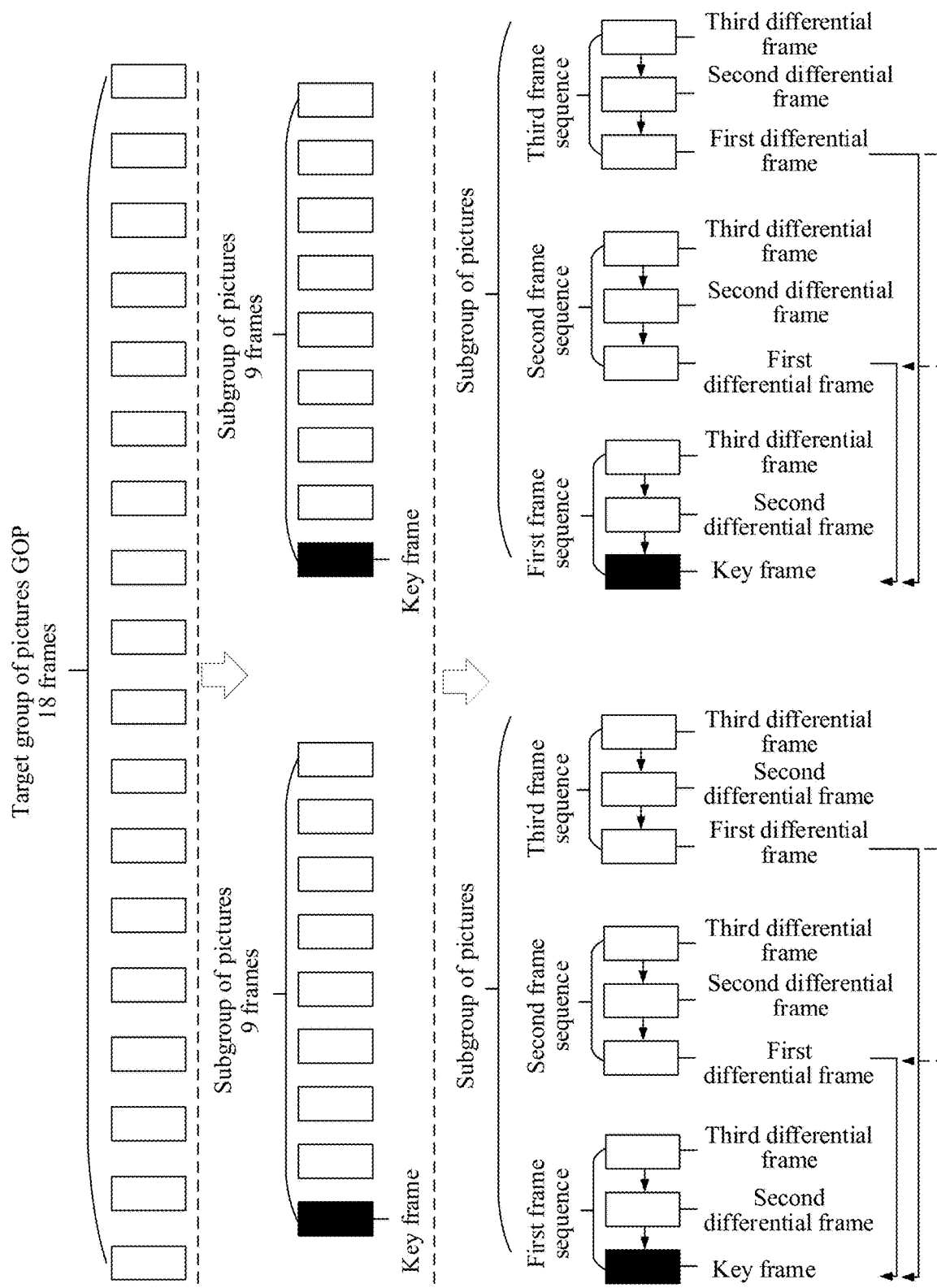
FIG. 3C is a schematic flowchart of processing a target group of pictures according to an embodiment of the present invention.

In a possible implementation, that a source end determines M key frames in a target group of pictures GOP includes: The source end obtains the target group of pictures GOP, and divides the target GOP into M subgroups of pictures based on a time sequence, where M is an integer greater than 0; and the source end determines a first frame in each subgroup of pictures as the key frame, to obtain the M key frames. Specifically, the M subgroups of pictures may be understood as a plurality of subgroups of pictures that are obtained by dividing the target GOP based on the time sequence, where M is an integer greater than 0. FIG. 3C is a schematic flowchart of processing a target group of pictures according to an embodiment of the present invention. After obtaining a target group of pictures of 18 frames, the source end may divide the 18 frames into two subgroups of pictures based on the time sequence, where each subgroup of pictures may include 9 frames, and a first frame in each subgroup of pictures is used as the key frame. Therefore, there are two key frames in total. It should be noted that in this embodiment of the present invention, the target group of pictures may be evenly distributed, or the target group of pictures may be grouped based on an actual requirement. Therefore, quantities of frames in each subgroup of pictures may be the same or may be different, which is not limited herein. In this embodiment of the present invention, the target group of pictures may be first grouped based on the time sequence, and the first frame in each group is further used as the key frame to obtain a plurality of key frames. If an error occurs in one of the plurality of key frames, only some frames in the target group of pictures are affected, thereby reducing a possibility of an error in streaming media data, reducing a streaming media data transmission delay, and effectively improving user experience.

Figure 3D:
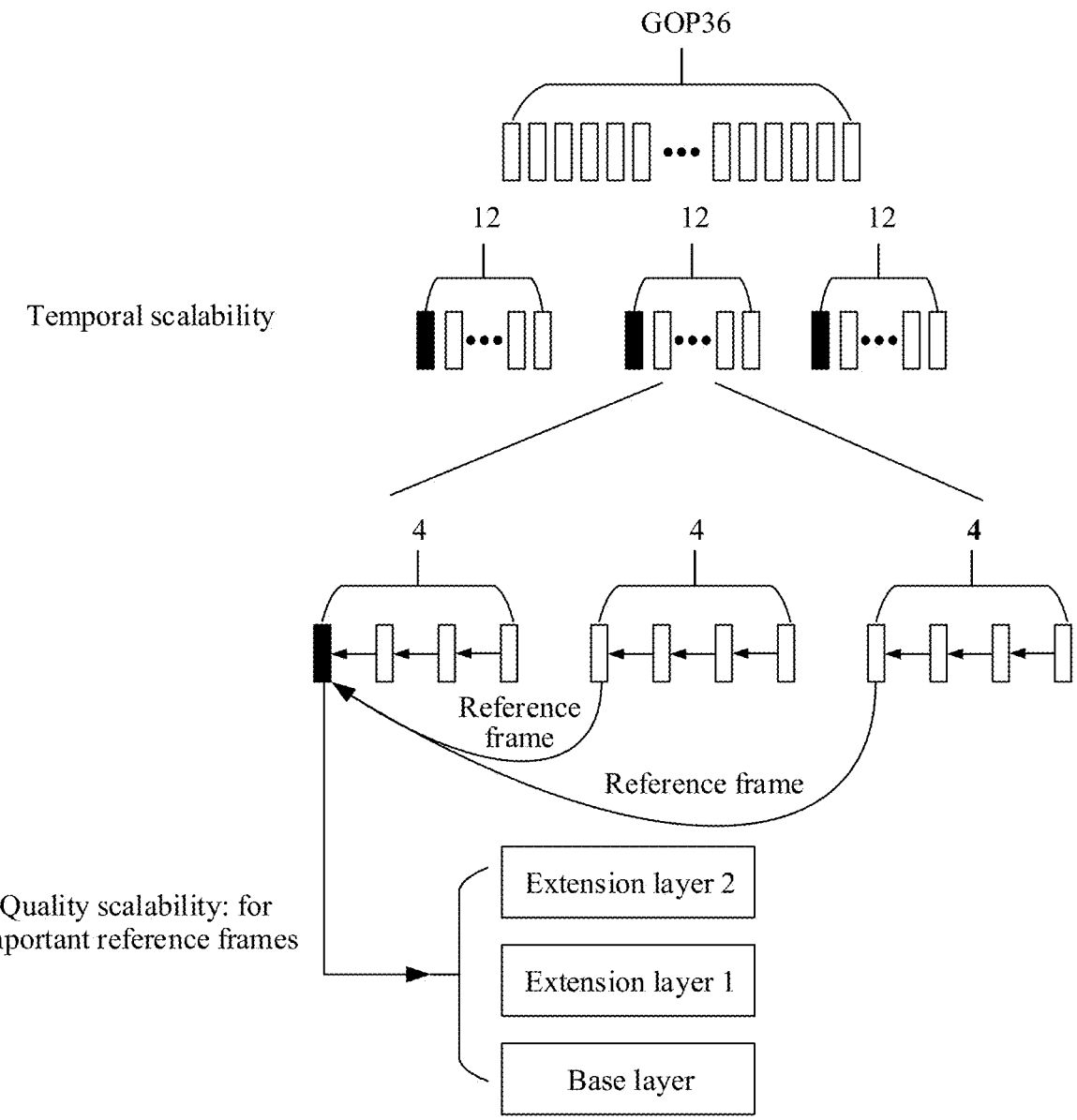
FIG. 3D is a schematic diagram of a frame sequence according to an embodiment of the present invention.

In a possible implementation, the method further includes: The source end divides each of the M subgroups of pictures into F frame sequences based on the time sequence, where F is an integer greater than 1, and each of the F frame sequences includes at least two frames. The source end obtains first differential frames of F−1 frame sequences other than a first frame sequence in the F frame sequences by using a frame header of a frame sequence in k−1 frame sequences before a $k^{th}$ frame sequence as a reference frame for a frame header of the $k^{th}$ frame sequence in the F frame sequences, where k is an integer greater than 2 and less than or equal to F. Specifically, the F frame sequences may be understood as a plurality of frame sequences obtained by dividing a subgroup of pictures based on the time sequence, where F is an integer greater than 1. The frame header of the $k^{th}$ frame sequence may be understood as a first frame in the $k^{th}$ frame sequence in the F frame sequences. The first differential frame may be understood as a first frame obtained based on a reference frame in each sequence. For example, as shown in FIG. 3C, after the target group of pictures is divided into two subgroups of pictures, each subgroup of pictures may be further divided into three frame sequences. A first frame in a first frame sequence of the subgroup of pictures is a key frame, a first frame in a second frame sequence uses the key frame as a reference frame, and a first frame in a third frame sequence may use the key frame as a reference frame, or may use a first differential frame in the second frame sequence as a reference frame, to obtain a first differential frame of each frame sequence in the subgroup of pictures. For another example, FIG. 3D is a schematic diagram of a frame sequence according to an embodiment of the present invention. In FIG. 3D, a GOP of 36 frames is divided into three subgroups of pictures based on the time sequence, and then each subgroup of pictures is divided into three frame sequences based on the time sequence. A first frame in a first frame sequence is a key frame, a first frame in a second frame sequence may obtain a first differential frame by referring to the key frame, and a first frame in a third frame sequence may obtain a first differential frame of the sequence by referring to the key frame or may obtain a first differential frame of the third sequence by referring to the first differential frame of the second frame sequence. In this embodiment of the present invention, after the target group of pictures is divided into a plurality of subgroups of pictures based on the time sequence, each subgroup of pictures may be further divided into a plurality of frame sequences based on the time sequence, and then a frame header of each frame sequence may use a key frame in the subgroup of pictures as a reference frame, or may use an obtained first differential frame as a reference frame. Therefore, different frames in the target group of pictures have a more flexible reference relationship, thereby reducing a possibility of an error in streaming media data, reducing a streaming media data transmission delay, and effectively improving user experience.

In a possible implementation, the method further includes: The source end obtains an $i^{th}$ differential frame of each frame sequence by using an $(i-1)^{th}$ frame as a reference frame for an $i^{th}$ frame in each of the F frame sequences, where i is an integer greater than 1. In this embodiment of the present invention, other frames other than the first frame in each frame sequence may use a previous frame as a reference frame, so that a data amount of streaming media data may be reduced to some extent, thereby reducing a streaming media data transmission delay and effectively improving user experience. For example, as shown in FIG. 3C, for each frame sequence in the figure, a third frame may use a second frame as a reference frame to obtain a third differential frame, and the second frame may use a first frame as a reference frame to obtain a second differential frame.

Step S302: The source end separately performs scalable encoding on source data of each of the M key frames and generates M pieces of base layer data and N pieces of extension layer data.

Figure 3E:
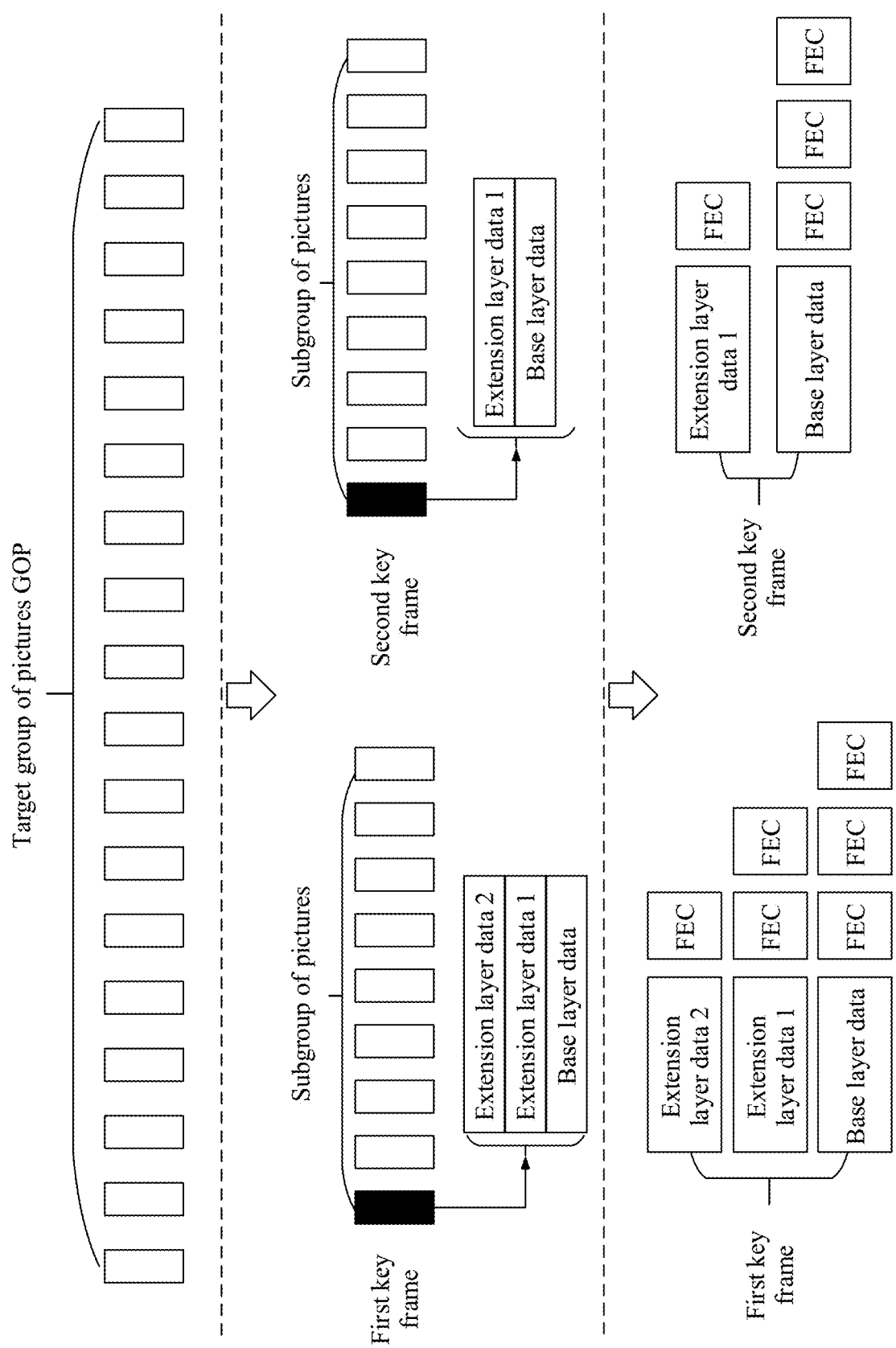
FIG. 3E is a schematic flowchart of processing source data of a key frame according to an embodiment of the present invention.

Specifically, data quality of extension layer data corresponding to each key frame is higher than data quality of base layer data corresponding to each key frame, where N is an integer greater than or equal to M. The source data may be understood as original data of a key frame. The base layer data may be understood as data with relatively low quality obtained after the source data is processed. The extension layer data may be understood as data with relatively high quality obtained after the source data is processed. For example, the base layer data may be used to restore standard-definition video data, and the extension layer data may be used to restore high-definition video data. For example, FIG. 3E is a schematic flowchart of processing source data of a key frame according to an embodiment of the present invention. In the figure, after source data of the key frame is processed, the base layer data and the extension layer data are obtained, one piece of the base layer data and two pieces of the extension layer data are obtained based on source data of a first key frame, and one piece of the base layer data and one piece of the extension layer data are obtained based on a second key frame. It should be noted that one piece of the base layer data and one or more pieces of the extension layer data may be obtained based on source data of one key frame, and a quantity of pieces of the extension layer data may change based on an actual situation, which is not limited herein.

Step S303: The source end performs differential protection on base layer data and extension layer data of each key frame to obtain first encoded data of the M key frames.

Specifically, the first encoded data includes M pieces of base layer data that have undergone the differential protection and N pieces of extension layer data that have undergone the differential protection. The differential protection may be understood as adding redundant data packets to the base layer data and the extension layer data separately for protection.

In a possible implementation, that the source end performs differential protection on the base layer data and the extension layer data of each key frame to obtain first encoded data of the M key frames includes: The source end dynamically adds m redundant data packets to the base layer data corresponding to each key frame and dynamically adds n redundant data packets to the extension layer data corresponding to each key frame, to generate the M pieces of base layer data that have undergone the differential protection and the N pieces of extension layer data that have undergone the differential protection, to obtain the first encoded data, where m is greater than n, m is an integer greater than 2, and n is an integer greater than 1. Specifically, a quantity of redundant data packets added to the base layer data or the extension layer data may be dynamically adjusted based on a current network condition. If the current network condition is relatively poor, the quantity of redundant data packets may be appropriately increased. However, for the base layer data and the extension layer data of a same key frame, because importance of the base layer data is higher than that of the extension layer data in this embodiment of the present invention, the quantity of redundant data packets added to the base layer data is required to be greater than the quantity of redundant data packets added to the extension layer data, so that the base layer data is not easily lost or damaged, thereby ensuring smoothness of a video image of a user, reducing a streaming media data transmission delay, and effectively improving user experience. For example, as shown in FIG. 3E, an adaptive forward error (FEC) correction technology is used. For the first key frame, three FEC packets are added to base layer data, two FEC packets are added to extension layer data 1, and one FEC packet is added to extension layer data 2. For the second key frame, three FEC packets are added to base layer data, and one FEC packet is added to extension layer data 1. It should be noted that the quantity of redundant data packets added to the data may change based on the current network condition. If the current network quality is poor, the quantity of redundant data packets may be increased properly. However, for the base layer data and the extension layer data corresponding to a same key frame, the quantity of redundant data packets added to the base layer data is required to be greater than the quantity of redundant data packets added to the extension layer data.

Figure 4A:
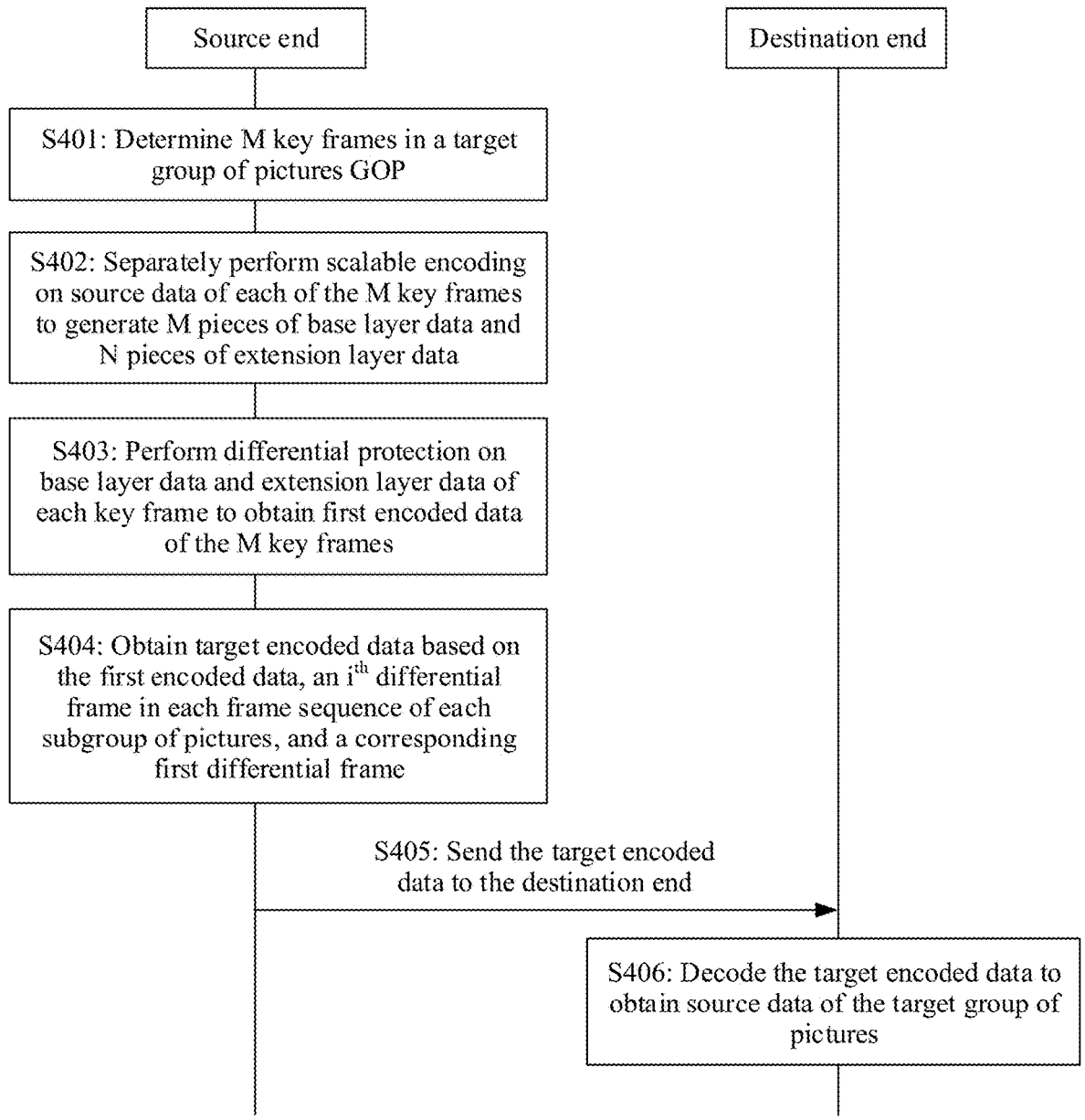
FIG. 4A is a schematic flowchart of another method for transmitting streaming media data according to an embodiment of the present invention.

FIG. 4A is a schematic flowchart of another method for transmitting streaming media data according to an embodiment of the present invention. The following describes the method for transmitting streaming media data in the embodiments of this application with reference to FIG. 4A and based on an interaction side between the source end and the destination end in FIG. 2A and FIG. 2B.

Step S401: A source end determines M key frames in a target group of pictures GOP.

Step S402: The source end separately performs scalable encoding on source data of each of the M key frames and generates M pieces of base layer data and N pieces of extension layer data.

Step S403: The source end performs differential protection on base layer data and extension layer data of each key frame to obtain first encoded data of the M key frames.

It should be noted that for detailed descriptions of step S401 to step S403, refer to step S301 to step S303.

Step S404: The source end obtains target encoded data based on the first encoded data, the $i^{th}$ differential frame in each frame sequence of each subgroup of pictures, and a corresponding first differential frame.

Specifically, the target encoded data is obtained based on related data of the key frame that has undergone scalable encoding and the differential protection and related data of other frames other than the key frame in the target group of pictures.

Step S405: The source end sends the target encoded data to a destination end.

Specifically, the target encoded data is obtained based on related data of the key frame that has undergone the scalable encoding and the differential protection and related data of other frames other than the key frame in the target group of pictures, and then the target encoded data is sent to the destination end, so that the destination end performs decoding and playing. In this way, occurrence of a retransmission event and packet loss may be reduced, thereby reducing a streaming media data transmission delay. In addition, streaming media data of different quality may be provided for the destination end for decoding and playing, thereby effectively improving user experience.

In a possible implementation, sending, by the source end, the target encoded data to the destination end includes: preferentially sending the M pieces of base layer data in the first encoded data that have undergone the differential protection, and then sending other data in the target encoded data other than the M pieces of base layer data that have undergone the differential protection. Specifically, differentiated scheduling is performed on different streaming media data. In a case of network air interface congestion or system scheduling shortage, it is required to ensure that information with a base layer tag (for example, M pieces of base layer data that have undergone differential protection) is preferentially transmitted, and then other information is sent. In this way, an access delay of an air interface may be reduced, thereby reducing a streaming media data transmission delay, and effectively improving user experience.

Figure 4B:
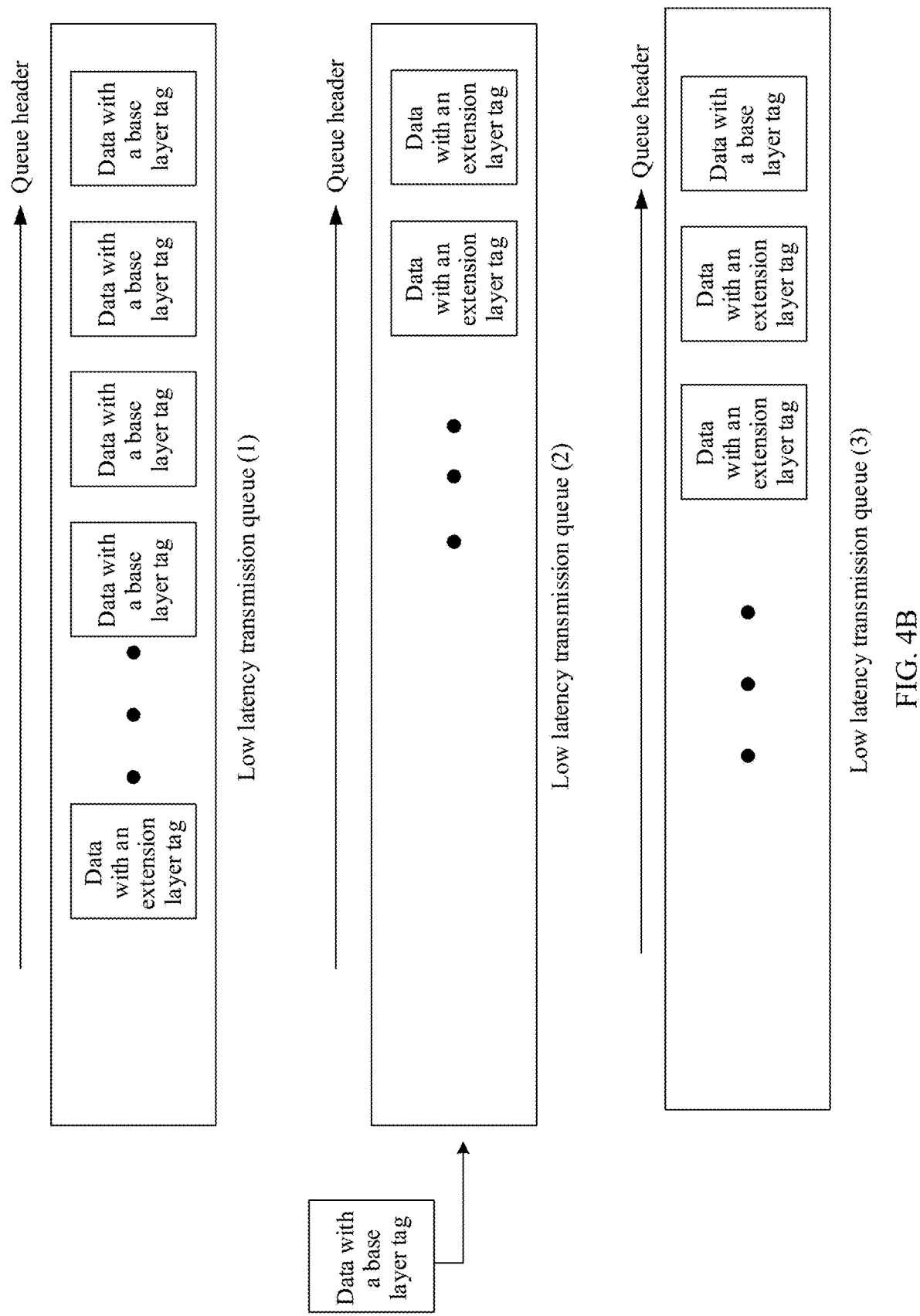
FIG. 4B is a schematic diagram of a low latency transmission queue according to an embodiment of the present invention.

In a possible implementation, the preferentially sending the M pieces of base layer data in the first encoded data that have undergone the differential protection includes: using, by the source end, the M pieces of base layer data that have undergone the differential protection as a header, and adding the other data in the target encoded data other than the M pieces of base layer data that have undergone the differential protection after the M pieces of base layer data that have undergone the differential protection, to obtain a low latency transmission queue; and sending the target encoded data to the destination end based on the low latency transmission queue. In this embodiment of the present invention, information with a base layer tag (for example, M pieces of base layer data that have undergone differential protection) is used as a queue header, and other information is added to a queue tail to obtain a low latency transmission queue. Data transmission is performed based on the low latency transmission queue, so that it can be ensured that the information with the base layer tag is preferentially transmitted, and then other information is sent. In this way, an access delay of an air interface is reduced, thereby reducing a streaming media data transmission delay, and effectively improving user experience. For example, FIG. 4B is a schematic diagram of a low latency transmission queue according to an embodiment of the present invention. As shown in a low latency transmission queue (1), data with a base layer tag is placed at a queue header, and then data with an extension layer tag may be placed at a queue tail. This ensures that data with the base layer tag can be preferentially transmitted during transmission. As shown in a low latency transmission queue (2) and a low latency transmission queue (3), during transmission, if a queue header is data with an extension layer tag, but data with a base layer tag needs to be transmitted, the queue is cleared, and the data with the base layer tag is added to the queue header, so that differentiated scheduling is implemented, and the data with the base layer tag is preferentially transmitted.

Figure 4C:
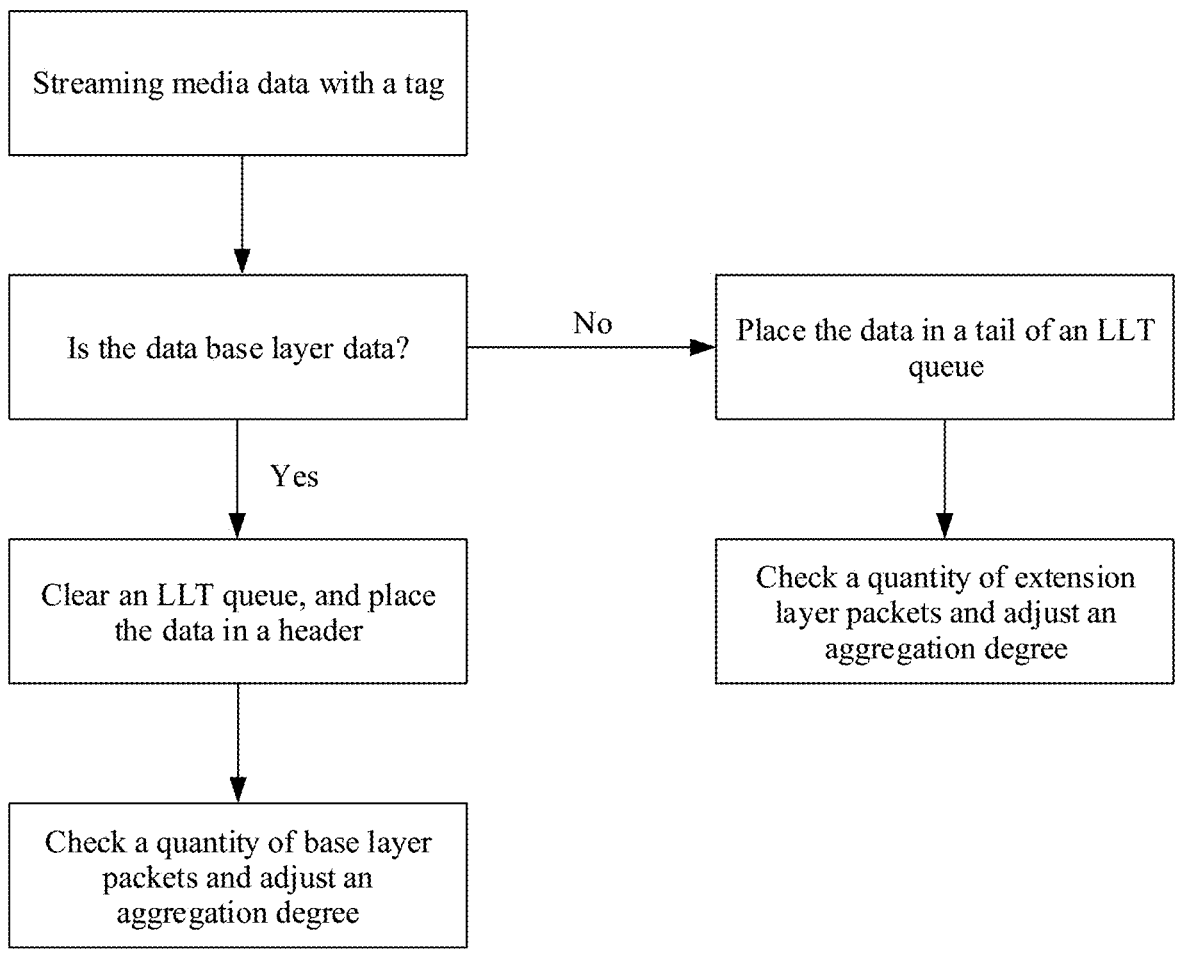
FIG. 4C is a schematic diagram of constructing a low latency transmission queue according to an embodiment of the present invention.

Optionally, FIG. 4C is a schematic diagram of constructing a low latency transmission queue according to an embodiment of the present invention. In the figure, it may be first determined whether streaming media data with a tag is data with a base layer tag. If the streaming media data with a tag is the data with a base layer tag, the low latency transmission LLT queue is cleared, the data is placed in the header, and then a quantity of packets of the base layer data is checked, and an aggregation degree is adjusted. If the streaming media data with a tag is not the data with a base layer tag, the data is placed in a tail of the LLT queue, and then a quantity of packets of the extension layer data is checked, and the aggregation degree is adjusted.

Step S406: The destination end decodes the target encoded data to obtain source data of the target group of pictures.

Specifically, the destination end receives the encoded streaming media information sent by the source end, and then decodes and plays the encoded streaming media information as required, so that occurrence of packet loss and a retransmission event may be reduced, thereby reducing a streaming media data transmission delay.

In this embodiment of the present invention, a plurality of key frames in the target group of pictures may be first determined, and then source data of the plurality of key frames is processed by using a scalable encoding technology and a differential protection technology to obtain encoded streaming media data, so that occurrence of packet loss and a retransmission event may be reduced in a streaming media data transmission process, thereby reducing a streaming media data transmission delay. Specifically, the scalable encoding is performed on the key frame, the source data of the key frame is processed into the base layer data and the extension layer data, and then the differential protection is performed on the base layer data and the extension layer data separately. Because the data quality of the base layer data is lower than the data quality of the extension layer data, enhanced protection may be performed on the base layer data, and reduced protection may be performed on the extension layer data, the base layer data is less likely to be lost and error-prone than the extension layer data in a streaming media data transmission process. Even if the extension layer data is lost, the destination end may decode and play the received correct base layer data. The method of this embodiment of the present invention is implemented, so that in streaming media data transmission, when information of the key frame is directly transmitted, a problem that the source end needs to resend data once packet loss occurs is avoided. In this way, occurrence of a retransmission event and packet loss may be reduced, thereby reducing a streaming media data transmission delay. In addition, streaming media data of different quality may be provided for the destination end for decoding and playing, thereby effectively improving user experience.

The methods in embodiments of the present invention are described in detail above, and a related device according to an embodiment of the present invention is provided below.

Figure 5A:
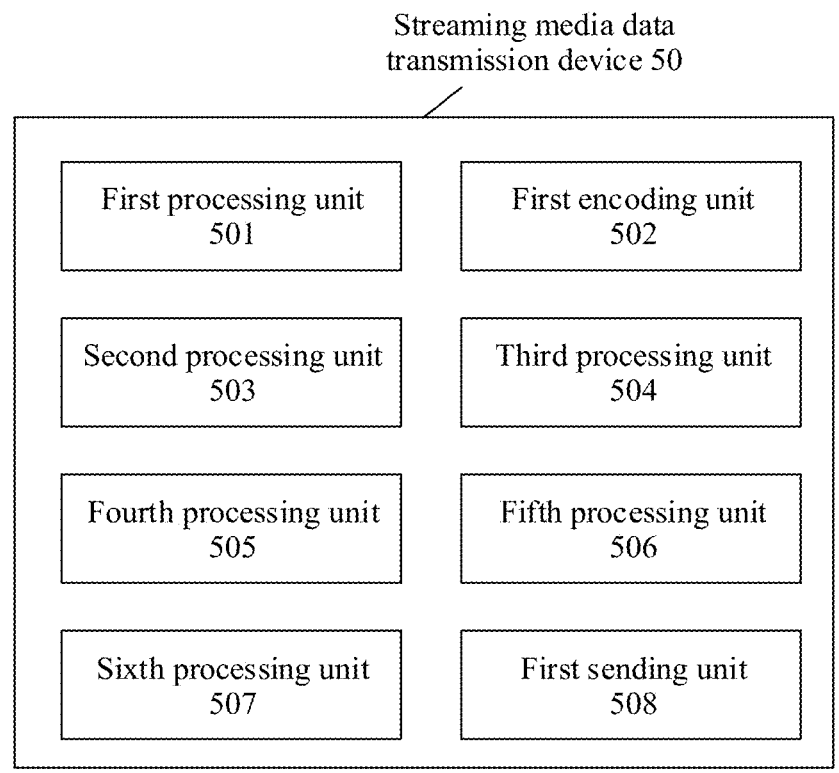
FIG. 5A is a schematic diagram of a streaming media data transmission device according to an embodiment of the present invention.

FIG. 5A is a schematic diagram of a streaming media data transmission device according to an embodiment of the present invention. The streaming media data transmission device 50 may include a first processing unit 501, a first encoding unit 502, a second processing unit 503, a third processing unit 504, a fourth processing unit 505, a fifth processing unit 506, a sixth processing unit 507, and a first sending unit 508. Detailed descriptions of the modules are as follows:

The first processing unit 501 is configured to determine M key frames in a target group of pictures GOP, where the target GOP includes L frames, M is an integer greater than 0, and L is an integer greater than 2.

The first encoding unit 502 is configured to separately perform scalable encoding on source data of each key frame in the M key frames, to generate M pieces of base layer data and N pieces of extension layer data, where data quality of extension layer data corresponding to each key frame is higher than data quality of base layer data corresponding to each key frame, and N is an integer greater than or equal to M.

The second processing unit 503 is configured to perform differential protection on the base layer data and the extension layer data of each key frame, to obtain first encoded data of the M key frames, where the first encoded data includes M pieces of the base layer data that have undergone the differential protection and N pieces of the extension layer data that have undergone the differential protection.

In a possible implementation, the first processing unit 501 is specifically configured to: obtain the target group of pictures GOP, and divide the target GOP into M subgroups of pictures based on a time sequence, where M is an integer greater than 0; and determine a first frame in each subgroup of pictures as the key frame, to obtain the M key frames.

In a possible implementation, the device further includes: the third processing unit 504, configured to divide each of the M subgroups of pictures into F frame sequences based on the time sequence, where F is an integer greater than 1, and each of the F frame sequences includes at least two frames; and the fourth processing unit 505, configured to obtain first differential frames of F−1 frame sequences other than a first frame sequence in the F frame sequences by using a frame header of a frame sequence in k−1 frame sequences before a $k^{th}$ frame sequence as a reference frame for a frame header of the $k^{th}$ frame sequence in the F frame sequences, where k is an integer greater than 2 and less than or equal to F.

In a possible implementation, the device further includes the fifth processing unit 506, configured to obtain an $i^{th}$ differential frame of each frame sequence by using an $(i-1)^{th}$ frame as a reference frame for an $i^{th}$ frame in each of the F frame sequences, where i is an integer greater than 1.

In a possible implementation, the second processing unit 503 is specifically configured to dynamically add m redundant data packets to the base layer data corresponding to each key frame and dynamically add n redundant data packets to the extension layer data corresponding to each key frame, to generate the M pieces of the base layer data that have undergone the differential protection and the N pieces of the extension layer data that have undergone the differential protection, to obtain the first encoded data, where m is greater than n, m is an integer greater than 2, and n is an integer greater than 1.

In a possible implementation, the device further includes: the sixth processing unit 507, configured to obtain target encoded data based on the first encoded data, the $i^{th}$ differential frame in each frame sequence of each subgroup of pictures, and a corresponding first differential frame; and the first sending unit 508, configured to send the target encoded data to a destination end.

In a possible implementation, the first sending unit 508 is specifically configured to preferentially send the M pieces of base layer data in the first encoded data that have undergone the differential protection, and then send other data in the target encoded data other than the M pieces of base layer data that have undergone the differential protection.

In a possible implementation, the first sending unit 508 is specifically configured to: use the M pieces of base layer data that have undergone the differential protection as a header, and add the other data in the target encoded data other than the M pieces of base layer data that have undergone the differential protection after the M pieces of base layer data that have undergone the differential protection, to obtain a low latency transmission queue; and send the target encoded data to the destination end based on the low latency transmission queue.

It should be noted that, for functions of functional units in the streaming media data transmission device 50 described in this embodiment of the present invention, refer to related descriptions of step S301, step S302, and step S303 in the method embodiment in FIG. 3A. Details are not described herein again.

Figure 5B:
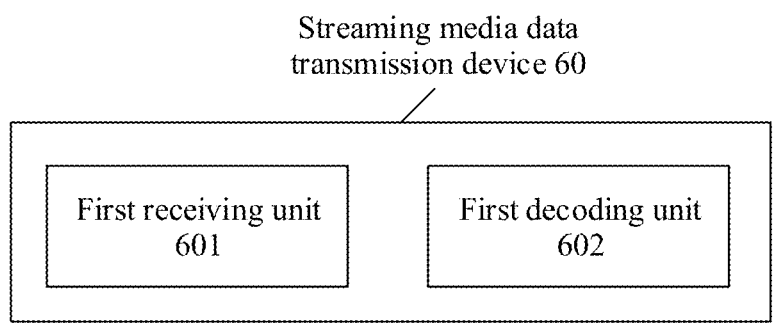
FIG. 5B is a schematic diagram of another streaming media data transmission device according to an embodiment of the present invention.

FIG. 5B is a schematic diagram of another streaming media data transmission device according to an embodiment of the present invention. The streaming media data transmission device 60 may include a first receiving unit 601 and a first decoding unit 602. Detailed descriptions of the modules are as follows:

The first receiving unit 601 is configured to receive target encoded data sent by a source end, where the target encoded data includes data information obtained after scalable encoding and differential protection are performed on source data of M key frames in a target group of pictures, and data information of differential frames in the target group of pictures.

The first decoding unit 602 is configured to decode the target encoded data to obtain source data of the target group of pictures.

It should be noted that, for functions of functional units in the streaming media data transmission device 60 described in this embodiment of the present invention, refer to related descriptions of step S406 in the method embodiment in FIG. 4A. Details are not described herein again.

An embodiment of the present invention provides an electronic device, including a processor, a memory, and a communication interface. The memory is configured to store program code for sending information, and the processor is configured to invoke program code of streaming media data transmission method to perform the method according to any implementation in which the execution body is the source end.

An embodiment of the present invention provides an electronic device, including a processor, a memory, and a communication interface. The memory is configured to store program code for sending information, and the processor is configured to invoke program code of streaming media data transmission method to perform the method according to any implementation in which the execution body is the destination end.

This application provides a chip system. The chip system includes at least one processor, a memory, and an interface circuit. The memory, the interface circuit, and the at least one processor are interconnected by using lines. At least one memory stores instructions. When the instructions are executed by the processor, the method according to any implementation in which the execution body is the source end is implemented.

This application provides a chip system. The chip system includes at least one processor, a memory, and an interface circuit. The memory, the interface circuit, and the at least one processor are interconnected by using lines. At least one memory stores instructions, and when the instructions are executed by the processor, the method according to any implementation in which the execution body is the destination end is implemented.

An embodiment of the present invention provides a computer storage medium. The computer storage medium stores a computer program. When the computer program is executed by a processor, the method according to any implementation in which the execution body is the source end is implemented.

An embodiment of the present invention provides a computer storage medium. The computer storage medium stores a computer program. When the computer program is executed by a processor, the method according to any implementation in which the execution body is the destination end is implemented.

This application provides a computer program. The computer program includes instructions. When the computer program is executed by a computer, the computer is enabled to perform the method according to any implementation in which the execution body is the source end is implemented.

This application provides a computer program. The computer program includes instructions. When the computer program is executed by a computer, the computer is enabled to perform the method according to any implementation in which the execution body is the destination end is implemented.

In the foregoing embodiments, descriptions of each embodiment have respective focuses. For a part that is not described in detail in an embodiment, refer to related descriptions in other embodiments.

It should be noted that for brief description, the foregoing method embodiments are represented as a series of actions. However, persons skilled in the art should appreciate that this application is not limited to the described order of the actions, because according to this application, some steps may be performed in other orders or simultaneously. It should be further appreciated by persons skilled in the art that embodiments described in this specification all belong to preferred embodiments, and the involved actions and modules are not necessarily required by this application.

In the several embodiments provided in this application, it should be understood that the disclosed apparatus may be implemented in other manners. For example, the described apparatus embodiments are merely examples. For example, division of the units is merely logical function division. During actual implementation, another division manner may be used. For example, a plurality of units or components may be combined or integrated into another system, or some features may be ignored or not be performed. In addition, the displayed or discussed mutual couplings or direct couplings or communication connections may be implemented by using some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a computer-readable storage medium and includes several instructions for instructing a computer apparatus (which may be a personal computer, a server, a network device, or the like, and may be specifically a processor in the computer device) to perform all or some of the steps of the methods in the embodiments of this application. The foregoing storage medium includes any medium that can store program code, for example, a USB flash drive, a removable hard disk, a magnetic disk, an optical disc, a read-only memory (Read-Only Memory, ROM for short), or a random access memory (Random Access Memory, RAM for short).

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A method for transmitting streaming media data, the method applied to a source end and comprising:
    determining M key frames in a target group of pictures (GOP), wherein the target GOP comprises L frames, M is an integer greater than 0, and L is an integer greater than 2;
    separately performing scalable encoding on source data of each of the M key frames to generate M pieces of base layer data and N pieces of extension layer data, wherein data quality of extension layer data corresponding to each key frame is higher than data quality of base layer data corresponding to each key frame, and N is an integer greater than or equal to M;
    performing differential protection on the base layer data and the extension layer data of each key frame to obtain first encoded data of the M key frames, wherein the first encoded data comprises M pieces of base layer data that have undergone the differential protection and N pieces of extension layer data that have undergone the differential protection;
    wherein the performing differential protection on the base layer data and the extension layer data of each key frame to obtain first encoded data of the M key frames comprises:
        dynamically adding m redundant data packets to the base layer data corresponding to each key frame and dynamically adding n redundant data packets to the extension layer data corresponding to each key frame to generate the M pieces of base layer data that have undergone the differential protection and the N pieces of extension layer data that have undergone the differential protection to obtain the first encoded data, wherein m is greater than n, m is an integer greater than 2, and n is an integer greater than 1, the quantity of the redundant data packets added to the base layer data or added to the extension layer data being dynamically adjusted based on a current network condition.

2. The method according to claim 1, wherein the determining M key frames in a target GOP comprises:
    obtaining the target GOP and dividing the target GOP into M subgroups of pictures based on a time sequence, wherein M is an integer greater than 0; and
    determining a first frame in each subgroup of pictures as the key frame to obtain the M key frames.

3. The method according to claim 2, wherein the method further comprises:
    dividing each of the M subgroups of pictures into F frame sequences based on the time sequence, wherein F is an integer greater than 1, and each of the F frame sequences comprises at least two frames; and
    obtaining first differential frames of F−1 frame sequences other than a first frame sequence in the F frame sequences by using a frame header of a frame sequence in k−1 frame sequences before a $k^{th}$ frame sequence as a reference frame for a frame header of the $k^{th}$ frame sequence in the F frame sequences, wherein k is an integer greater than 2 and less than or equal to F.

4. The method according to claim 3, wherein the method further comprises:
    obtaining an $i^{th}$ differential frame of each frame sequence by using an $(i-1)^{th}$ frame as a reference frame for an $i^{th}$ frame in each of the F frame sequences, wherein i is an integer greater than 1.

5. The method according to claim 1, wherein the method further comprises:
    obtaining target encoded data based on the first encoded data, the $i^{th}$ differential frame in each frame sequence of each subgroup of pictures, and a corresponding first differential frame; and
    sending the target encoded data to a destination end.

6. The method according to claim 5, wherein the sending the target encoded data to a destination end comprises:
    preferentially sending the M pieces of base layer data in the first encoded data that have undergone the differential protection, and sending other data in the target encoded data other than the M pieces of base layer data that have undergone the differential protection.

7. The method according to claim 6, wherein the preferentially sending the M pieces of base layer data in the first encoded data that have undergone the differential protection comprises:
    applying the M pieces of base layer data that have undergone the differential protection as a header and adding data in the target encoded data other than the M pieces of base layer data that have undergone the differential protection to obtain a low latency transmission queue; and
    sending the target encoded data to the destination end based on the low latency transmission queue.

8. A device for transmitting streaming media data, the device comprising:
    a first processing unit configured to determine M key frames in a target group of pictures (GOP), wherein the target GOP comprises L frames, M is an integer greater than 0, and L is an integer greater than 2;
    a first encoding unit configured to separately perform scalable encoding on source data of each key frame in the M key frames to generate M pieces of base layer data and N pieces of extension layer data, wherein data quality of extension layer data corresponding to each key frame is higher than data quality of base layer data corresponding to each key frame, and N is an integer greater than or equal to M;
    a second processing unit configured to perform differential protection on the base layer data and the extension layer data of each key frame to obtain first encoded data of the M key frames, wherein the first encoded data comprises M pieces of the base layer data that have undergone the differential protection and N pieces of the extension layer data that have undergone the differential protection;
    wherein the performing differential protection on the base layer data and the extension layer data of each key frame to obtain first encoded data of the M key frames comprises:
        dynamically adding m redundant data packets to the base layer data corresponding to each key frame and dynamically adding n redundant data packets to the extension layer data corresponding to each key frame to generate the M pieces of base layer data that have undergone the differential protection and the N pieces of extension layer data that have undergone the differential protection to obtain the first encoded data, wherein m is greater than n, m is an integer greater than 2, and n is an integer greater than 1, the quantity of the redundant data packets added to the base layer data or added to the extension layer data being dynamically adjusted based on a current network condition.

9. The device according to claim 8, wherein the first processing unit is configured to:
  obtain the target group of pictures (GOP) and divide the target GOP into M subgroups of pictures based on a time sequence, wherein M is an integer greater than 0; and
  determine a first frame in each subgroup of pictures as the key frame to obtain the M key frames.

10. The device according to claim 9, wherein the device further comprises:
  a third processing unit configured to divide each of the M subgroups of pictures into F frame sequences based on the time sequence, wherein F is an integer greater than 1, and each of the F frame sequences comprises at least two frames; and
  a fourth processing unit configured to obtain first differential frames of F−1 frame sequences other than a first frame sequence in the F frame sequences by using a frame header of a frame sequence in k−1 frame sequences before a $k^{th}$ frame sequence as a reference frame for a frame header of the $k^{th}$ frame sequence in the F frame sequences, wherein k is an integer greater than 2 and less than or equal to F.

11. The device according to claim 10, wherein the device further comprises:
  a fifth processing unit configured to obtain an $i^{th}$ differential frame of each frame sequence by using an $(i-1)^{th}$ frame as a reference frame for an $i^{th}$ frame in each of the F frame sequences, wherein i is an integer greater than 1.

12. The device according to claim 8, wherein the device further comprises:
  a sixth processing unit configured to obtain target encoded data based on the first encoded data, the $i^{th}$ differential frame in each frame sequence of each subgroup of pictures, and a corresponding first differential frame; and
  a first sending unit configured to send the target encoded data to a destination end.

13. The device according to claim 12, wherein the first sending unit is configured to:
  preferentially send the M pieces of base layer data in the first encoded data that have undergone the differential protection and send data in the target encoded data other than the M pieces of base layer data that have undergone the differential protection.

14. The device according to claim 13, wherein the first sending unit is configured to:
  apply the M pieces of base layer data that have undergone the differential protection as a header and add data in the target encoded data other than the M pieces of base layer data that have undergone the differential protection after the M pieces of base layer data that have undergone the differential protection to obtain a low latency transmission queue; and
  send the target encoded data to the destination end based on the low latency transmission queue.

* * * * *